United States Patent [19]

Hammer et al.

[11] Patent Number: 4,930,545

[45] Date of Patent: Jun. 5, 1990

[54] SAUSAGE CASING WITH IMPROVED UNIFORMITY OF DIAMETER

[75] Inventors: Klaus-Dieter Hammer, Mainz-Mombach; Hermann Winter, Wiesbaden-Biebrich; Rolf Buettner, Huenstetten-Kesselbach, all of Fed. Rep. of Germany

[73] Assignee: Hoechst Aktiengesellschaft, Frankfurt/Main, Fed. Rep. of Germany

[21] Appl. No.: 51,773

[22] Filed: May 20, 1987

[30] Foreign Application Priority Data

May 24, 1986 [DE] Fed. Rep. of Germany ....... 3617500

[51] Int. Cl.$^5$ ............................................. F16L 11/04
[52] U.S. Cl. .................... 138/118.1; 426/135; 428/34.8
[58] Field of Search ...................... 138/118.1; 426/105, 426/135, 138; 428/34.8

[56] References Cited

U.S. PATENT DOCUMENTS

| | | | |
|---|---|---|---|
| 4,356,199 | 10/1982 | Hammer et al. | 138/118.1 X |
| 4,356,200 | 10/1982 | Hammer et al. | 138/118.1 X |
| 4,357,371 | 11/1982 | Heinrich et al. | 427/238 |
| 4,401,136 | 8/1983 | Porrmann et al. | 138/118.1 |
| 4,409,251 | 10/1983 | Higgins | 138/118.1 X |
| 4,556,708 | 12/1985 | Andrae et al. | 536/57 |
| 4,563,231 | 1/1986 | Porrmann et al. | 156/90 |
| 4,662,403 | 5/1987 | Hammer et al. | 138/118.1 |

FOREIGN PATENT DOCUMENTS

| | | |
|---|---|---|
| 3240847 | 5/1984 | Fed. Rep. of Germany . |
| 3328947 | 2/1985 | Fed. Rep. of Germany . |
| 8505880 | 5/1985 | Fed. Rep. of Germany . |
| 2745991 | 10/1985 | Fed. Rep. of Germany . |

*Primary Examiner*—James E. Bryant, III
*Attorney, Agent, or Firm*—Foley & Lardner, Schwartz, Jeffery, Schwaab, Mack, Blumenthal & Evans

[57] ABSTRACT

Described is a tubular artificial sausage casing based on fiber-reinforced cellulose which shows, in the completely soaked state as compared to the state prior to soaking in water, an increase in length of from about 0.8 to 2.5% and a transverse shrinkage of from about 2.5 to 5.2%. Preferably, the change of diameter of the casing at the same change of pressure in the range above 20 kPa is approximately equal for the completely soaked state and for a moisture content of from about 22 to 27% by weight. In a preferred embodiment, the sausage casing can be filled with sausage meat without being previously soaked in water and, for this purpose, has a moisture content of from about 22 to 27% by weight and a glycerol content of from about 17 to 20% by weight, in each case based on its total weight, and is provided with a fungicide on its outside surface. Described also is the production of the sausage casing according to the viscose process, in which the tube comprised of cellulose hydrate gel shrinks from about 2 to 10% in the longitudinal direction and is strongly expanded in the transverse direction during the final drying process.

7 Claims, 1 Drawing Sheet

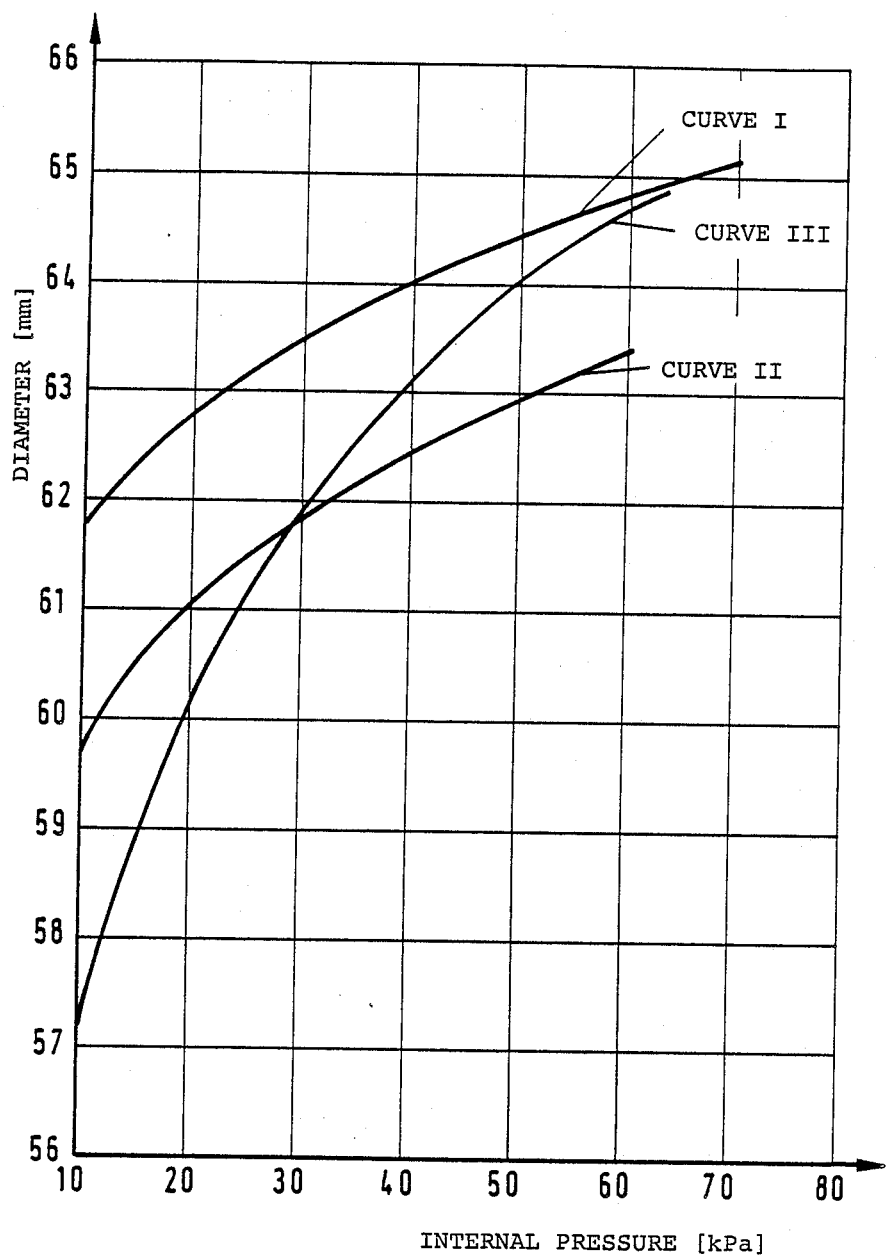

SAUSAGE CASING WITH IMPROVED UNIFORMITY OF DIAMETER

BACKGROUND OF THE INVENTION

The present invention relates to a tubular artificial sausage casing based on fiber-reinforced cellulose and to a process for producing this casing. Such sausage casings are also referred to as fibrous casings.

As is known, sausage casings of this kind are completely saturated with water before they are stuffed with sausage meat. For this purpose, the sausage casings are placed in a water bath for about 15 to 30 minutes. After soaking, the cellulose tube has a water content of from 80 to 120%, based on the cellulose. This value is called the "swelling value" and refers to the maximum water-retention capacity. The moisture content of cellulose casings is usually indicated in percent by weight, based on the total weight of the casing. Sausage meat is pressed into the completely soaked sausage casing and, in the process, the casing, which has an increased flexibility due to its high water content, is expanded by about 10 to 15% in the circumferential direction to its socalled "stuffing diameter", at a stuffing pressure which is not too high.

To expand the sausage casing it is necessary to retard its running off from the stuffing horn during stuffing with sausage meat. For this purpose, the casing is retained at the orifice of the stuffing horn, for example, by means of a casing clamp, and a restraining force is thus generated. The higher this restraining force, the higher the internal pressure in the sausage casing rises and the larger the outside diameter of the sausage will be. In practice it has generally been shown that the conventional fiber-reinforced casings have a specific, most favorable minimum diameter upon filling, which depends on their diameter in the dry state (moisture content from 8 to 12%). When a sausage casing reaches this so-called "stuffing diameter" it closely contacts the sausage meat, and the sausage thus obtained looks plump and crease-free. The stuffing diameter is set down in tables by the manufacturers of the casings for each size and type of casing and serves as a guide to the processors in the production of sausages. If a casing is not filled up to the recommended stuffing diameter, the resulting sausage looks crinkled and has a non-uniform cross section. On the other hand, if the sausage casing is filled to substantially exceed the stuffing diameter, there is an increased risk of bursting during filling or during the subsequent scalding or smoking process.

A specific restraining force which causes a rise of the internal pressure is necessary to expand the sausage casing to its stuffing diameter. To obtain a sausage showing the highest possible uniformity of diameter, the restraining force must remain as constant as possible, which can often be controlled only with difficulty. It is therefore the most important object of this invention to find a way of reducing variations of the stuffing diameter in the filling process.

The restraining force or the internal pressure, respectively, which is required to stuff a sausage casing to its full size (stuffing diameter) is non-adjustably set in modern automatic stuffing machines for the conventional completely soaked sausage casings. If a so-called "ready-to-stuff" sausage casing of fiber-reinforced cellulose is used, i.e., a casing having sufficient moisture content that further moisture need not be added prior to stuffing, this casing is less flexible due to its low water content. Since the recommended stuffing diameter is independent of whether the sausage casing has been completely soaked prior to filling or has a lower moisture content, the internal pressure chosen to attain the same stuffing diameter, as in the case of a completely soaked casing, must be substantially higher when a ready-to-stuff casing type is filled. For a moisture content of only 29 to 42%, the internal pressure must correspond to two to three times the internal pressure used for filling a completely soaked casing, as indicated, for example, in German Patent No. 27 45 991.

These values, however, apply to the hitherto customary fiber-reinforced tubular cellulose casings oily, the expansion behavior of which is described in German Patent No. 27 45 991. The expansion behavior of these sausage casings, hereinafter called "standard casings", is also evident from the fact that they shrink by 1 to 2% in the longitudinal direction and by 2 to 3% in the transverse direction, after having been completely soaked in water (40° to 50° C., for about 30 minutes).

A change of the restraining force on the filling machine for the purpose of processing different sausage casing types, however, entails an undesirable expenditure of work for the processor. In addition, the casing material is heavily mechanically stressed when the restraining force is increased by two to three times its value and, as a result, the risk of bursting rises and more frequent interruptions of production must be expected during processing.

In the filling of ready-to-stuff cellulose casings, the internal pressure could only be reduced to the values applicable to completely soaked casings, if uniformity of diameter would be dispensed with and tightly stuffed sausages were not important.

SUMMARY OF THE INVENTION

It is therefore an object of the present invention to provide a tubular artificial sausage casing based on fiber-reinforced cellulose in which the uniformity of the stuffing diameter attained in the filling process is improved.

It is a particular object of the invention to provide a sausage casing in which variations of internal pressure which may occur during filling have only the least possible effects on the stuffing diameter. It is also an object to provide a sausage casing which permits the use of a lower stuffing pressure for expanding the improved sausage casing in the completely soaked state to the same stuffing diameter as compared with customary casings of the type which have been completely soaked in water.

It is also an object of the invention to provide at artificial sausage casing based on fiber-reinforced cellulose, which does not have to be soaked before it is stuffed with sausage meat, i.e., which is ready-to-stuff, and which, notwithstanding the low water content of the casing material, does not require an increase of the restraining force in the filling process over that used for completely soaked standard casings, to obtain the usual stuffing diameter of the standard casings. Another object of the invention is to provide a casing in connection with which it is no longer necessary to adjust the machine setting when alternately processing ready-to-stuff and standard casing types.

Furthermore, it is an object of the invention to markedly reduce the mechanical stress which acts on the ready-to-stuff sausage casing during the filling process, Still another object of the invention resides in the provision of a process for producing the sausage casing according to the invention.

Other objects of the invention include the provision of an improved sausage product and an improved process for producing this sausage product.

In accomplishing the foregoing objects, there has been provided according to one aspect of the present invention a tubular artificial sausage casing, comprising a tubular casing of fiber-reinforced cellulose, wherein the sausage casing has the property that, after it has been soaked in water at about 40° C. to 50° C. for a period of 30 minutes and has returned to room temperature, the casing exhibits an increase in length of from about 0.8 to 2.5% and a transverse shrinkage of from about 2.5 to 5.2%, compared to its state prior to soaking in water. Preferably, the sausage casing further has the property that the change of diameter per unit change of pressure in the range above 20 kPa is approximately equal for the casing in the completely soaked state and at a moisture content of from about 22 to 27% by weight. In one preferred embodiment, a ready-to-stuff casing is provided having a moisture content of from about 22 to 27% by weight and a glycerol content of from about 17 to 20% by weight, each based on its total weight, and having a fungicide on its outside surface, whereby the casing can be filled with sausage meat without being previously soaked in water.

According to another aspect of the invention, there has been provided a process for producing a sausage casing as described above, comprising the steps of: coating a fiber tube with viscose by means of an annular nozzle; converting the viscose into regenerated cellulose to produce a fiber-reinforced cellulose hydrate gel tube; and shrinking the tube comprised of cellulose hydrate gel from about 2 to 10% in the longitudinal direction while it is strongly expanded in the transverse direction during drying.

There has also been provided according to the invention a filled sausage product, comprising a tubular casing material filled with a sausage composition, wherein the casing material is a casing as defined above, and also an improved process for producing this filled sausage product.

Further objects, features and advantages of the invention will become apparent from the detailed description of preferred embodiments which follows, when considered together with the attached sheet of drawing.

BRIEF DESCRIPTION OF THE DRAWING

The FIGURE of drawing is a set of expansion curves for sausage casings according to the invention compared to a standard casing.

DETAILED DESCRIPTION OF PREFERRED EMBODIMENTS

The sausage casing of the invention exhibits an expansion behavior which is entirely different from that of conventional fibrous casings available on the market. This is evident from the expansion curves which have a relatively flat course compared to those of the standard casings (German Patent No. 27 45 991), as depicted in the accompanying drawing which is explained below. Another essential difference from the standard casings resides in the fact that the expansion curves of the casing according to the invention in the completely soaked state and at a low moisture content (25% by weight) are approximately parallel, while the expansion curves of the known casings flatten with decreasing moisture content. From this parallel slope behavior it follows that, in the casing of the invention, the variation of diameter ($K$) at the same variation of pressure ($p$) is to a large extent independent of the moisture content present in the casing. This applies to the pressure range above 20 kPa, which is of particular interest in the processing of sausage casings.

As compared with the standard casing of fiber-reinforced cellulose, the stuffing diameter of the sausage casing according to the invention, which has been completely soaked in water prior to processing, can be attained at a considerably lower restraining force or lower internal pressure, respectively, as a result of which the mechanical stress acting on the casing is reduced. Variations of internal pressure cause only a minute deviation of the stuffing diameter of not more than 0.5 mm, and, consequently, a markedly improved uniformity of diameter is obtained.

This advantageous expansion behavior is expressed in terms of the dimensional change after complete soaking in water. While the standard casings show a clear shrinkage in the longitudinal direction after soaking in water, the sausage casing of the invention extends by 0.8 to 2.5%. Also in the transverse direction a marked difference is observed. The sausage casing of the invention shrinks to a comparatively high degree, i.e. by 2.5 to 5.2%, in the transverse direction, whereas transverse shrinkage is considerably lower in the standard casing.

When, on the other hand, the sausage casing of the invention is used as the ready-to-stuff type, i.e., having a water content which is by far lower than in the completely soaked state, but which has proved adequate for the filling process, it is not necessary to raise the restraining force on the stuffing machine. The internal pressure used for stuffing the sausage casing corresponds to the internal pressure required for a completely soaked standard casing to attain the same stuffing diameter. Changes in machine setting are therefore not necessary if, in the course of processing, a ready-to-stuff casing of the invention is substituted for a completely soaked standard casing. Due to the relatively high water content of the ready-to-stuff casing type, there is a risk that the casing is attacked by mold fungi during storage. It is therefore necessary to treat the casing with a suitable fungicide.

In a particularly advantageous embodiment of the ready-to-stuff sausage casing, mechanical stress acting on the casing material is markedly reduced by an internal coating comprising a combination of three components, namely an oil, a cured water-insoluble cationic resin and a fungicide. This manifests itself in a reduced number of interruptions of the filling process. The number of failures caused by bursting of the casing material or tearing upon twisting of the casing or fixing the clip is considerably lower.

The oil provided for this internal coating is, it particular, a natural or synthetic triglyceride mixture of fatty acids having a carbon chain length in the range from 4 to 14 carbon atoms or a silicone oil. The water-insoluble cationic resin of the internal coating is a crosslinked, cured condensation product. A coating comprising these two components is described in European Patent No. 0 088 308, the disclosure of which is hereby incorporated by reference. In addition to this mixture of substances, a fungicide is present in the preferred coating mixture of the invention.

Fungicides suitable for treating the outside and inside surfaces of the sausage casing are, for example, mentioned in German Offenlegungsschrift No. 32 40 847, the combinations of cationic resins and sorbic acid radicals bonded thereto by a salt-like linkage described in that publication being preferably used. Another suitable combination of cationic resin and fungicide is described in German Utility Model No. 85 05 880. The described combination comprises casein which is crosslinked with glyoxal and sorbic acid radicals bonded to this cationic resin by a salt-like linkage. In addition to these combinations of cationic resins and fungicides, the oil components are also present. Optionally, glycerol monolaurate is used as the only, or as an additional, fungicide (cf. German Offenlegungsschrift No. 33 28 947).

In lieu of this internal coating, other combinations of compounds can also be employed to impart particular properties to the casing. Coatings can be applied which facilitate peeling of the casing from the sausage meat, which improve the adhesion between the casing and the sausage meat, which are impermeable to gases, or which facilitate shirring of the casing. These coatings are known in the art.

The sausage casing is produced according to the viscose process. In the process, a paper web formed into a tube is coated with viscose through an annular spinning nozzle and is then treated with an acid precipitating liquid which causes the viscose to coagulate. Prior to dying, the regenerated cellulose is present in the form of cellulose hydrate gel. A glycerol treatment is usually effected by passing the casing which is in the gel state through an aqueous glycerol solution. Glycerol treatment is followed by the drying process leading to the expansion and shrinking properties of the sausage casing, which are essential features of the invention.

When traveling through the drying channel, the tube which is in the inflated state is passed between two pairs of driven nip rolls, the first pair of nip rolls being disposed at the inlet and the second at the outlet of the drying channel. The rotational speed of the second pair of nip rolls is from 2 to 10%, in particular from 3 to 6%, lower than the rotational speed of the first pair of nip rolls at the inlet of the drying channel. If, for example, the first pair of nip rolls has a rotational speed of 10 m/min., the second pair of nip rolls has a circumferential speed of from 9.0 to 9.8 m/min. During the drying process, a comparatively high internal pressure must, moreover, be present in the interior of the tube, which leads to a strong radial expansion of the tube. For this purpose, the internal pressure is adjusted so that the flat width FW of the tube which has been dried to a moisture content of from 8 to 20% by weight, based on its total weight, and is wound up in the laid-flat state, i.e., the so-called "dry-flat width", has a particular ratio to the diameter $D_s$ of the annular spinning nozzle, which results from the following equation:

$$FW = \frac{D_s \times \pi \times F}{2}$$

The factor F is a quantity which depends on the diameter of the sausage casing and ranges between about 0.95 and 1.05, the lower value referring to largediameter sausage casings and the higher value to smalldiameter sausage casings. It has been found, for example, that for casing diameters ranging from 40 to 65 mm the optimum value of the factor F is about 1.03, whereas for casing diameters of 120 mm and above, the preferred value is 0.98. For casing diameters in the intermediate range the dry-flat width is adjusted such that F is approximately 1.00.

This special way of conducting the drying process imparts a strong transverse orientation to the tubular casing. The tube shrinks considerably in the longitudinal direction and is strongly radially expanded to have an extremely high flat width. The amount of material required for radial expansion is obtained from the shrinkage of the tubular casing in the direction of its longitudinal axis.

After drying, the tube has a moisture content of about 8 to 12% and a glycerol content of about 20 to 24%, each based on its total weight. Prior to shirring, the tube is moistened to a water content which is optimal for this process step and normally amounts to about 16 to 20%.

If the sausage casing is intended for use as a ready-to-stuff type, it is moistened to a water content of from about 22 to 27%, based on its total weight. This relatively narrow range has proved optimal for the sausage casing having the particular expansion behavior which is an essential feature of the invention. It is not necessary to modify the glycerol content after the drying process since, due to the higher water content of the ready-to-stuff casing, the glycerol content drops to values of about 17 to 20%, based on the total casing weight.

The water content of the ready-to-stuff casing, is increased to about 22 to 27% either before or after shirring or even during shirring, for example, by spraying the inside of the casing through the shirring mandrel.

For internally coating the sausage casing, an aqueous dispersion comprising emulsified oil, fungicide and still water-soluble cationic resin is introduced into the interior of the tube of cellulose hydrate gel. The cationic resin is cured at the elevated temperature applied in the subsequent drying process. The dispersion contains about 1 to 4% by weight of the emulsified oil, such that the quantity of oil applied amounts to about 150 to 600 mg/m$^2$. This coating has a great advantage, in particular for the sausage casing which is used without moistening, since it still further reduces the mechanical stress acting on the tube material and thus prevents interruptions of the filling process.

The invention is explained in detail by the following examples and also with reference to the accompanying drawing.

EXAMPLE 1

A paper web formed into a tube is passed through an annular spinning nozzle as described, for example, in German Patent No. 19 65 130, and is coated with viscose on both sides. The diameter of the spinning nozzle is 58.9 mm. The viscose-coated tube is then treated with a precipitating liquid in the usual manner, and the viscose is thereby converted into cellulose hydrate gel. The usual desulfurization and removal of an excess of acid and salts are then carried out in washing baths. Thereafter, the tube travels through a bath containing an aqueous glycerol solution, taking up glycerol in the process. The outside of the tube is then treated with a 3% by weight glycerol monolaurate emulsion as a fungicide. For internally coating the tube, an aqueous solution of the following composition is present in a looped portion of the tube:

48.3 l of water, 0.3 kg of potassium sorbate,
6.0 l of glycerol,
5.8 l of epichlorohydrin-polyaminepolyamide resin as the cationic resin (®Resamin HW 601, 12.5% by weight strength in water, manufacturer: Cassella),
3.6.l of triglyceride based on $C_5$ to $C_{10}$ fatty acids as the oil component (®SoftenolEmulsion, 50% by weight strength oil/water emulsion, manufacturer: Dynamit Nobel).

Behind the tubing loop the tube moves upward, so that any excess solution flows downward on the inner tube wall. The tube then reaches a drying channel where it is inflated with supporting air between two pairs of driven nip rolls. Due to the different rotational speeds of the pairs of nip rolls, the entry speed of the tube into the drying channel is 5% higher than its discharge speed at the end of the drying channel. This results in a 5% length relaxation of the tube. The tube is expanded by supporting air to such an extent that, after drying to a moisture content of about 8 to 12% and laying flat, it has a dry-flat width of 94 to 96 mm (factor F=1.03). The glycerol content is about 22 to 23%. Prior to winding up, the tube is sprayed with water to raise its moisture content to 18 to 20% by weight, based on its total weight. After soaking in water at 40° C. for 30 minutes, a tube sample shows an extension of 1.5% in the longitudinal direction and a shrinkage of 3.2% in the transverse direction.

A length of the tube obtained is shirred into a hollow rod on a conventional shirring machine. During the shirring process, the tube inside is sprayed with water through the hollow shirring mandrel, such that the finished rod has a final moisture content of 24 to 26% by weight, based on its total weight. As a result of the higher proportion of water, the glycerol content of the rod amounts to about 18 to 19% by weight, based on its total weight. The hollow rod can be processed without further moistening with water. It is filled with a sausage meat emulsion of the salami type on an automatic stuffing machine. In the process, the units which retard drawing-off of the sausage casing from the stuffing horn need not be readjusted, as compared to the processing of completely soaked standard casings. The sausages obtained present a very uniform diameter of from 62 to 62.5 mm.

EXAMPLE 2

Another length of the tube obtained in Example 1 is shirred in the same manner, however, without internally spraying through the shirring mandrel.

The resulting hollow rod has a moisture content of from 18 to 20% by weight, based on its total weight. Prior to the stuffing process, the hollow rod is placed in warm water at 50° C. for 30 minutes and is then filled with sausage meat of the salami type on an automatic stuffing machine. Using the same machine setting as in Example 1, the sausages obtained present a larger, very uniform stuffing diameter of from 63 to 64 mm.

EXAMPLE 3

As in Example 1, a fiber-reinforced tubular casing of regenerated cellulose is produced; however, the inside and outside surfaces of the tube are not coated as described in Example 1. The spinning nozzle has a diameter of 118.6 mm. Expansion of the tube during drying results in a dry-flat width of the tube wound up in the laid-flat state of from 177 to 179 mm (factor F=0.96). The length relaxation is 5% as in Example 1. The tube is moistened after drying as indicated in Example 1. It contains approximately the same amount of glycerol.

A tube sample which, after drying, is soaked in water at about 45° C. for 30 minutes shows an extension of 2.3% in the direction of its longitudinal axis and a shrinkage of 2.9% in the transverse direction.

The tubular casing is shirred and, after complete soaking in water, filled with sausage meat of the mortadella type on an automatic stuffing machine. The sausages obtained have a very uniform diameter of from 128.0 to 128.5 mm.

EXAMPLE 4

A fiber-reinforced tubular casing of regenerated cellulose is produced as in Example 1. The casing contains approximately the same proportion of glycerol as indicated in Example 1. The spinning nozzle has a diameter of 63.0 mm. As in Example 1, the outside surface of the tubular casing of cellulose hydrate gel is treated with glycerol monolaurate as a fungicide, the inside surface is coated with an 0.6% by weight strength aqueous solution of the cationic resin of Example 1. Expansion in the following drying process leads to a dry-flat width of the tube of from 98 to 100 mm (factor F=1.00). The length relaxation is 5% as in Example 1.

In the drying process, the resin layer is simultaneously cured and rendered water-insoluble. It serves as an anchoring agent for a subsequently applied barrier layer.

Before the dried tube is wound up it is conditioned to a moisture content of from 10 to 12%. Thereafter an additional internal coating process is performed using an aqueous dispersion of a vinylidene chloride copolymer to produce a barrier layer which is impermeable to steam and oxygen, as described, for example, in German Offenlegungsschrift No. 30 12 250 (coating weight from 9 to 11 g/m$^2$). The tube is then dried to remove the dispersing agent and form the barrier layer, and in the process a corresponding expansion of the tube is necessary to keep its dry-flat width at 98 to 100 mm. A tube sample soaked with water at 40° C. for 30 minutes shows an increase in length of 1.3% and a transverse shrinkage of 3.5%.

Before the tube is shirred, its moisture content is raised to 24%, based on its total weight, by spraying the tube outside with water.

The hollow rod produced can be filled with sausage meat on automatic stuffing machines without being further soaked in water. Sausages stuffed with finely minced pork sausage meat present a very uniform stuffing diameter of from 64.5 to 65 mm.

EXAMPLE 5

The tube produced according to Example 4 is shirred into hollow rods at a moisture content of 18%. Prior to filling, the hollow rods are soaked in warm water at 50° C. for 30 minutes and are then stuffed with liver sausage emulsion on an automatic stuffing machine. The sausages obtained present a very uniform stuffing diameter of from 66 to 66.5 mm.

The accompanying FIGURE shows three curves representing the increase in diameter of fiber-reinforced cellulose casings as a function of internal pressure. The internal pressure is produced by pressing air into the casings. Curve I shows the expansion behavior of the casing of the invention in the completely soaked state, Curve II applies to the same casing with a moisture content of 25% by weight, based on the weight of the casing (ready-to-stuff type). As compared to the casing of the invention, Curve III shows the expansion behavior of a standard casing in the completely soaked state. In each case, the casings have a starting diameter of 58 mm (moisture content about 10% by weight). The recommended stuffing diameter is about 62 mm. It is obvious that the ready-to-stuff casing of the invention (Curve II) can be filled at approximately the same stuffing pressure as a completely soaked standard casing (Curve III) to obtain the required stuffing diameter. Curves I and II also show that the increase of stuffing diameter at the same change of pressure is practically independent of the moisture content of the casing. This applies to the pressure range above 20 kPa, where the stuffing diameter is attained. In the range below 20 kPa, the curve referring to the casing with low moisture content (Curve II) has even a steeper slope than the curve referring to the completely soaked casing (Curve I). When comparing Curves I and III it is evident that due to the flatter course of Curve I, the completely soaked casing of the invention shows smaller variations of the casing diameter in the case of pressure variations than the completely soaked casing of the prior art. As a consequence, the casing corresponding to Curve I can be stuffed with sausage meat at a more uniform diameter.

The moisture contents of the sausage casings were, in each case, determined by titration according to Karl Fischer.

We claim:

1. A tubular artificial sausage casing produced by a process comprising the steps of (a) supplying a fiber tube, (b) coating said fiber tube with viscose, (c) converting said viscose into regenerated cellulose to produce a fiber-reinforced cellulose hydrate gel tube, and (d) drying said gel tube while causing shrinkage longitudinally of about 2 to 10% and transverse expansion in said gel tube, said casing having the property that, upon a treatment comprised of being soaked for 30 minutes in water at a temperature of about 40° C. to 50° C. and subsequently being cooled to room temperature, said casing undergoes an increase in length of about 0.8 to 2.5% and transverse shrinkage of about 2.5 to 5.2%, as compared to the length and diameter, respectively, of said casing in a dry state before said treatment, and wherein said coating step is performed by means of an annular nozzle and said transverse expansion is effected in such a manner that the flat width of said tube after said drying and after laying of said tube flat complies with the relationship:

$$FW = \frac{D_s \times \pi \times F}{2}$$

wherein:

FW denotes said flat width, $D_s$ is the diameter of said annular nozzle and F is an integer ranging between about 0.95 and 1.05.

2. A sausage casing as claimed in claim 1 wherein the sausage casing is such that, in a soaked state, with a moisture content of about 22 to 27% by weight, and in a pressure range above 20 kPa, a change in diameter of said casing by application of pressure is approximately directly proportional to the pressure change.

3. A sausage casing as claimed in claim 1, wherein said casing (i) has a moisture content of about 22 to 27% by weight and a glycerol content of about 17 to 20% by weight, each relative to the casing total weight, (ii) carries a fungicide on its outside surface, and (iii) can be filled with sausage meat without being previously soaked in water.

4. A sausage casing as claimed in claim 3, wherein the casing comprises a coating on its inside surface, said coating comprising an oil, a cured, waterinsoluble cationic resin and a fungicide.

5. A sausage casing as claimed in claim 3, wherein the fungicide comprises at least one of a material selected from the group consisting of a cured polyamidepolyamineepichlorohydrin resin and a crosslinked casein, said material having sorbic acid radicals bonded thereto by a salt-like linkage, and glycerol monolaurate.

6. A sausage casing as claimed in claim 4, wherein the fungicide comprises at least one of a material selected from the group consisting of a cured polyamidepolyamineepichlorohydrin resin and a crosslinked casein, said material having sorbic acid radicals bonded thereto by a salt-like linkage, and glycerol monolaurate.

7. A tubular artificial sausage casing according to claim 1, wherein expansion in the transverse direction during said drying is effected by introducing a supporting gas into the interior of said gel tube.

* * * * *